United States Patent [19]

Ueda et al.

[11] Patent Number: 4,581,693

[45] Date of Patent: Apr. 8, 1986

[54] APPARATUS FOR REPEATEDLY APPLYING SHORT-CIRCUIT PULSES TO A CURRENT TYPE INVERTER FOR OUTPUT CURRENT CONTROL

[75] Inventors: Shigeta Ueda, Hitachi; Mitsuyuki Hombu, Katsuta; Yasuo Matsuda, Hitachi, all of Japan

[73] Assignee: Hitachi, Ltd., Tokyo, Japan

[21] Appl. No.: 600,902

[22] Filed: Apr. 16, 1984

[30] Foreign Application Priority Data

| Apr. 15, 1983 [JP] | Japan | 58-66760 |
| May 4, 1983 [JP] | Japan | 58-78600 |
| Nov. 2, 1983 [JP] | Japan | 58-204673 |

[51] Int. Cl.$^4$ .......................................... H02M 7/527
[52] U.S. Cl. ..................................... 363/41; 318/811; 363/42; 363/96
[58] Field of Search .................. 363/41, 42, 96, 137, 363/58; 318/811

[56] References Cited

FOREIGN PATENT DOCUMENTS

| 81133 | 6/1983 | European Pat. Off. | 363/41 |
| 148182 | 11/1981 | Japan | 363/41 |
| 196872 | 12/1982 | Japan | 363/41 |
| 202884 | 12/1982 | Japan | 363/41 |
| 89073 | 5/1983 | Japan | 363/58 |
| 154377 | 9/1983 | Japan | 363/58 |

Primary Examiner—William H. Beha, Jr.
Attorney, Agent, or Firm—Antonelli, Terry & Wands

[57] ABSTRACT

An apparatus for controlling a current type inverter including a bridge circuit of bridge-connected self-extinguish elements triggered by pulse width modulation signals. A current is provided for applying a single or plural triggering pulses having a desired pulse width to those self-extinguish elements connected in series with the other self-extinguish elements forming the pairs in the bridge circuit and which other self-extinguish elements are turned on by the pulse width modulation signals. By the above manner of control, the current type inverter can generate output currents of sinusoidal waveform, and the value of the output currents can be controlled over a very wide range.

9 Claims, 26 Drawing Figures

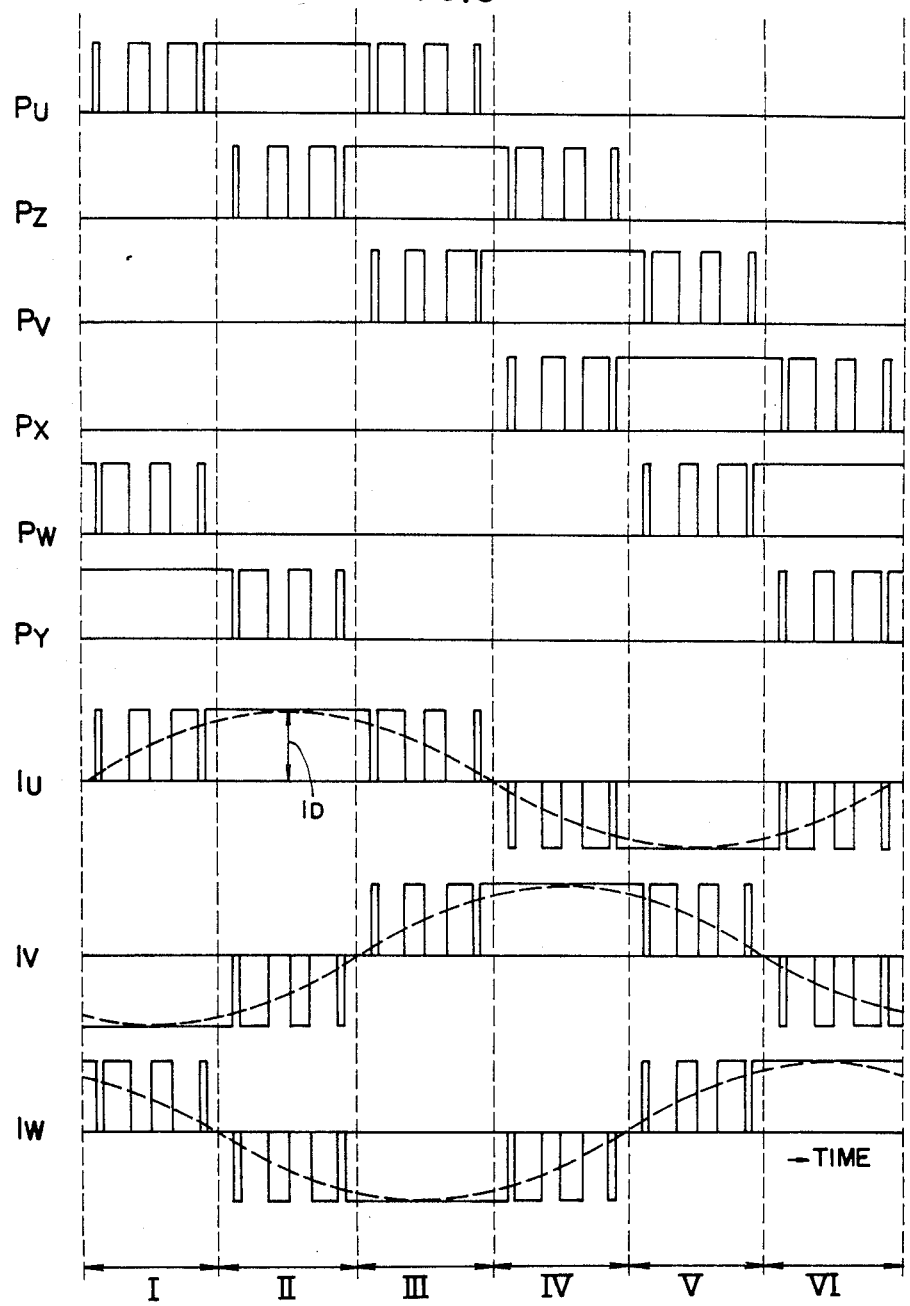

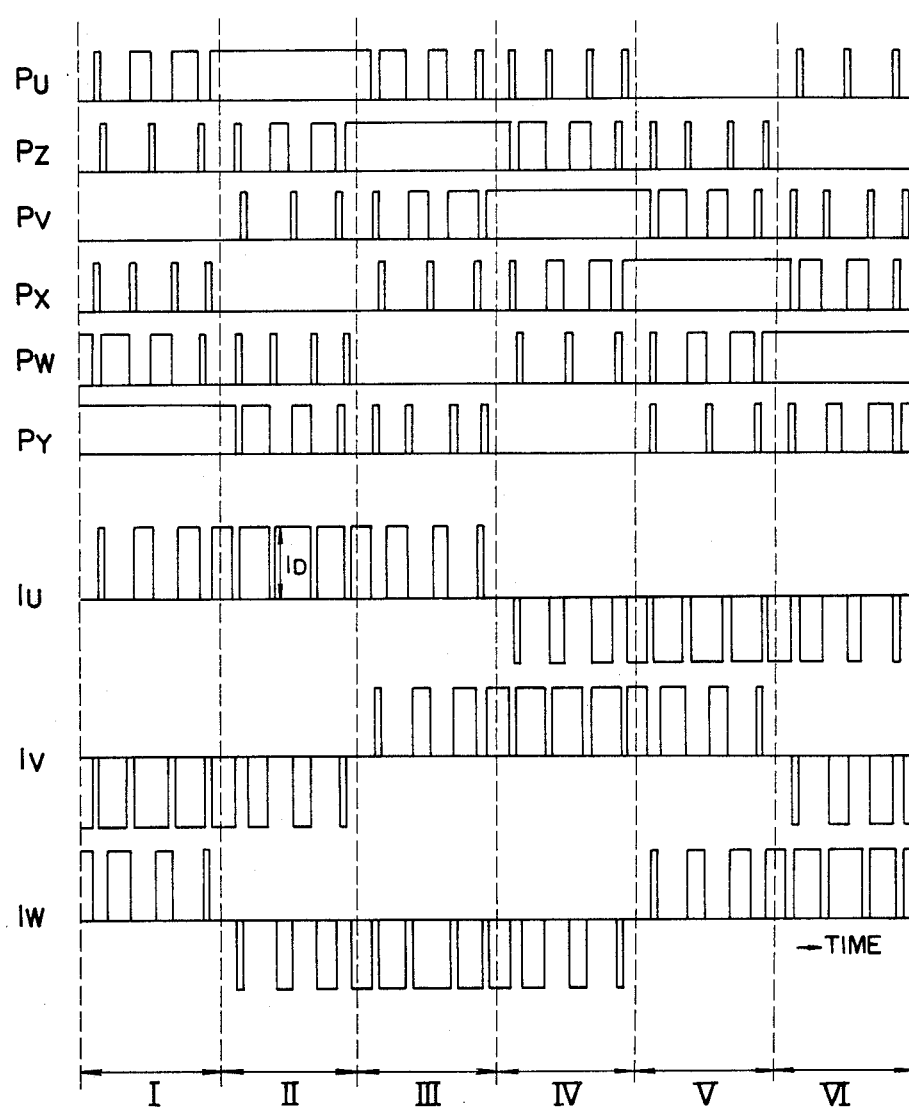

APPARATUS FOR REPEATEDLY APPLYING SHORT-CIRCUIT PULSES TO A CURRENT TYPE INVERTER FOR OUTPUT CURRENT CONTROL

This invention relates to the control of current type inverters, and more particularly to the control of a current type inverter utilizing self-extinguish elements for pulse width modulation control.

Inverters converting DC power into AC power having a desired frequency are broadly classified into a voltage type and a current type. In the case of the voltage type inverter, its output current waveform is generally sinusoidal, while its output voltage waveform includes pulses distributed in a sinusoidal pattern. On the other hand, in the case of the current type inverter, its output voltage waveform is sinusoidal, while its output voltage waveform is a square waveform.

In regard to the latter type or current type inverter including thyristors, a proposal has been made in which the inverter is controlled according to a pulse width modulation method similar to that used for the control of the voltage type, so as to improve its output current waveform. However, there has been a limitation in the modulation frequency range in view of the operating characteristics of the thyristors used to constitute the prior art current type inverter, and the desired improvement of the output current waveform by the pulse width modulation technique has been limited to a specific frequency range only. With a view to obviate the drawback of the prior art current type inverter, the inventors have proposed a current type inverter which utilizes self-extinguish elements operable even in a high frequency range, which is simple in construction and in which pulse width modulation control can be effected up to the high frequency range. (Japanese Patent Application No. 56-186815 corresponding to U.S. patent application Ser. No. 443,398 and EPC Patent Application Ser. No. 82110784.4).

Such a current type inverter using self-extinguish elements as proposed by the inventors can provide an output current waveform closer to the sinusoidal waveform than the prior art one when high-frequency pulse width modulation is effected. However, an attempt to control not only the output current waveform but also the value of the output currents of the proposed current type inverter has been quite difficult as far as the known manner of pulse pattern control is resorted to. This is because, in the case of the current type inverter which is supplied with direct current from a DC power source and which is not allowed to be left in an open-circuit condition unlike the voltage type inverter, the pulse pattern for effecting the control according to the pulse width modulation technique must be determined within the above limitation.

More precisely, in the case of the current type inverter, one of the phases at the positive arms and one of the phases at the negative arms must be in the on-state. Therefore, when the width of pulses applied to one of the phases is narrowed so as to decrease the output current of that phase, the width of pulses applied to another phase must be widened. This results not only in an unbalance of the output currents of the three phases but also in a non-sinusoidal output current waveform. Therefore, the desired output current waveform cannot be obtained when the balance among the three phases and the current waveforms of the three phases are considered.

A technique for generating a sinusoidal output current waveform from a current type inverter is discussed in a paper entitled "A Novel PWM Technique for Three Phase Inverter/Converter" reported by T. Ohnishi et al in IEEJ, Conference Record IPEC-Tokyo, pp. 384-395 (March, 1983).

This paper discloses an inverter control apparatus capable of providing a sinusoidal output current waveform and capable of also controlling the value of the output currents. However, the proposed control apparatus requires a high switching frequency resulting in an increased loss of the elements. Accordingly, the proposed control apparatus has shortcomings from the viewpoints of efficiency improvement and capacity increase.

It is therefore a primary object of the present invention to provide an apparatus for controlling a current type inverter, which can provide output voltages and output currents of sinusoidal waveform containing higher harmonics in a very small proportion and which can achieve variable control of the output currents over a wide range.

The current type inverter control apparatus according to the present invention is featured by the fact that, during the period of time in which each of the switching elements constituting the inverter bridge is turned on by a pulse width modulation signal, a triggering pulse or pulses are applied also to the switching element, which is connected in series with the first-mentioned switching element to form a pair, for a predetermined period of time thereby short-circuiting the path of direct current during that period of time, and the pulse width of the triggering pulse or pulses and the triggering timing are controlled to control the duration and timing of short-circuiting the DC path thereby providing the output currents of desired value.

The present invention will be apparent from the following detailed description taken in conjunction with the accompanying drawings, in which:

FIG. 3 shows the relation between the output pulses of the prior art inverter control apparatus shown in FIG. 2 and the three-phase output currents of the inverter;

FIG. 5 shows the relation between the output pulses of the inverter control apparatus shown in FIG. 4 and the three-phase output currents of the inverter;

Figure 7:
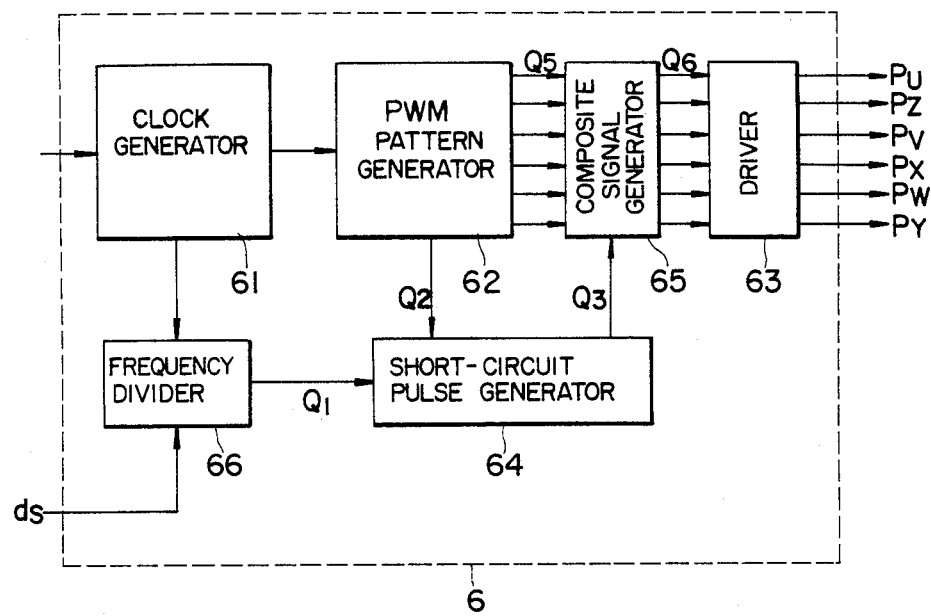
FIG. 7 is a block diagram showing the structure of another embodiment of the present invention.
Figure 10:
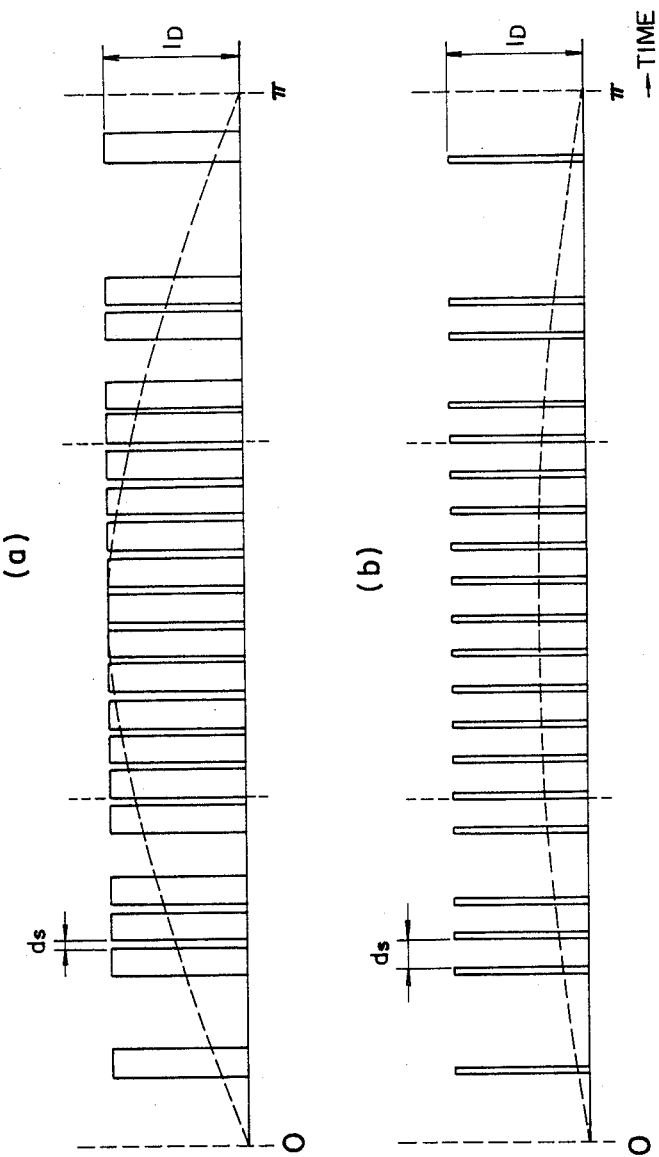
Figure 11:
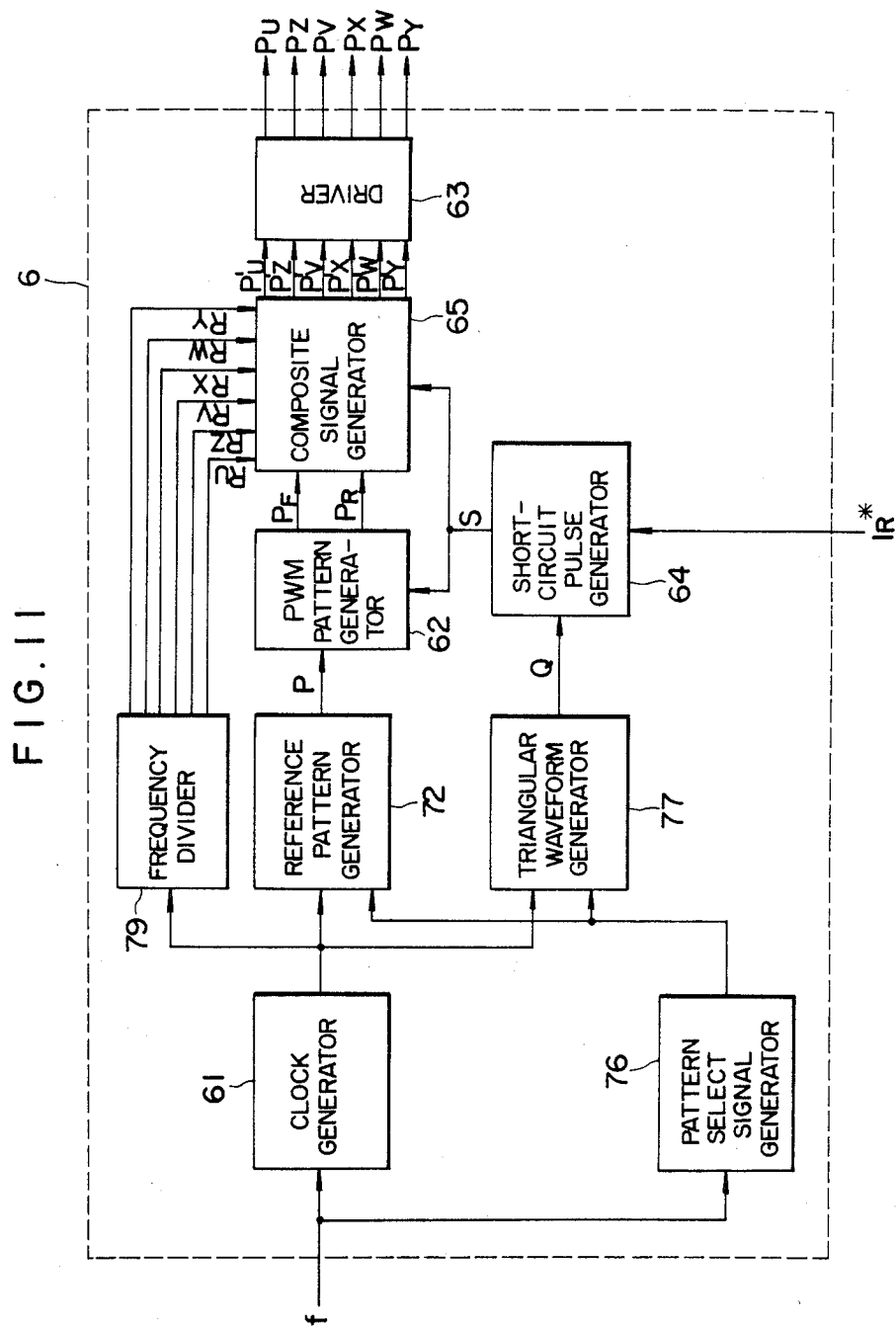
Figure 12:
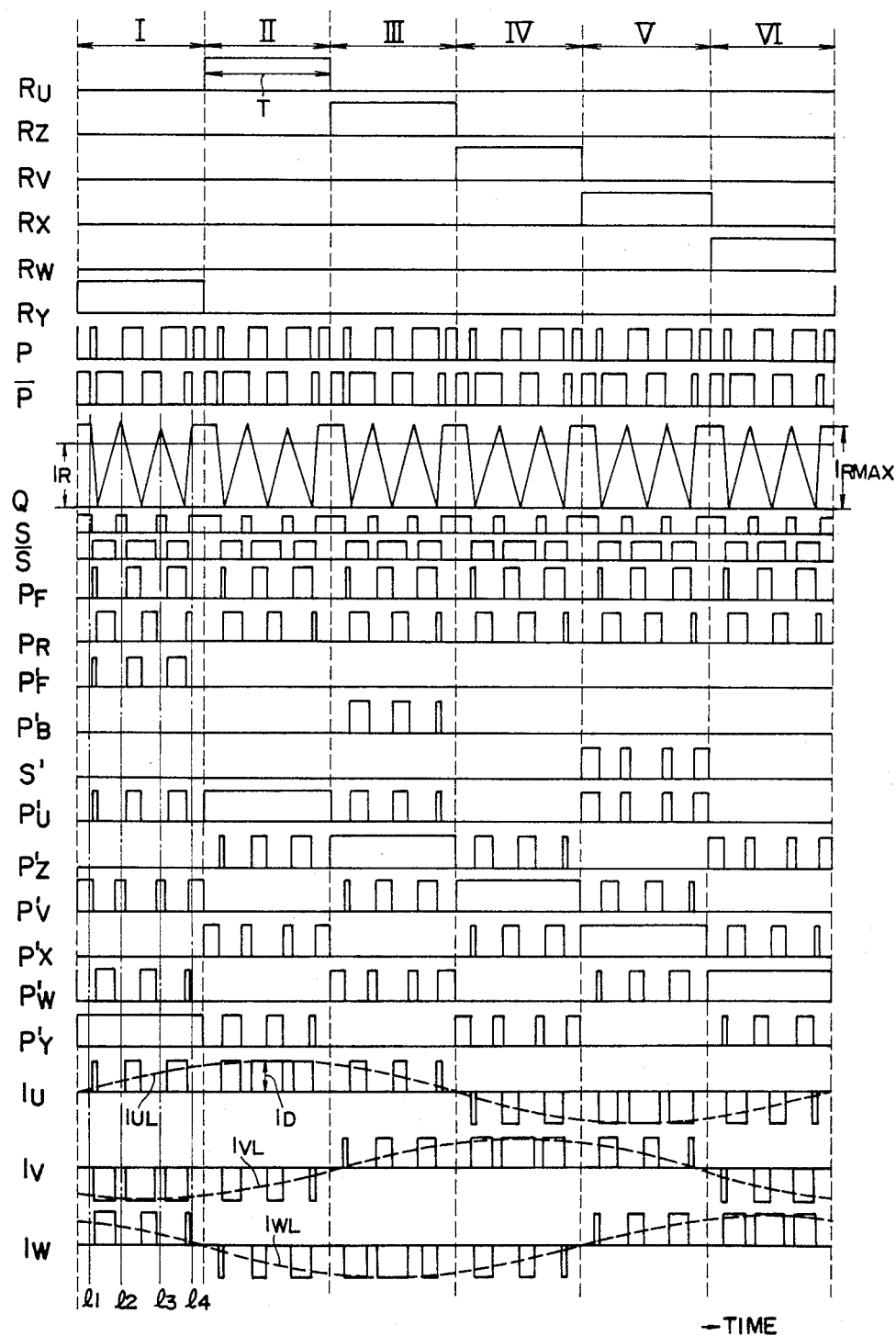
Figure 13:
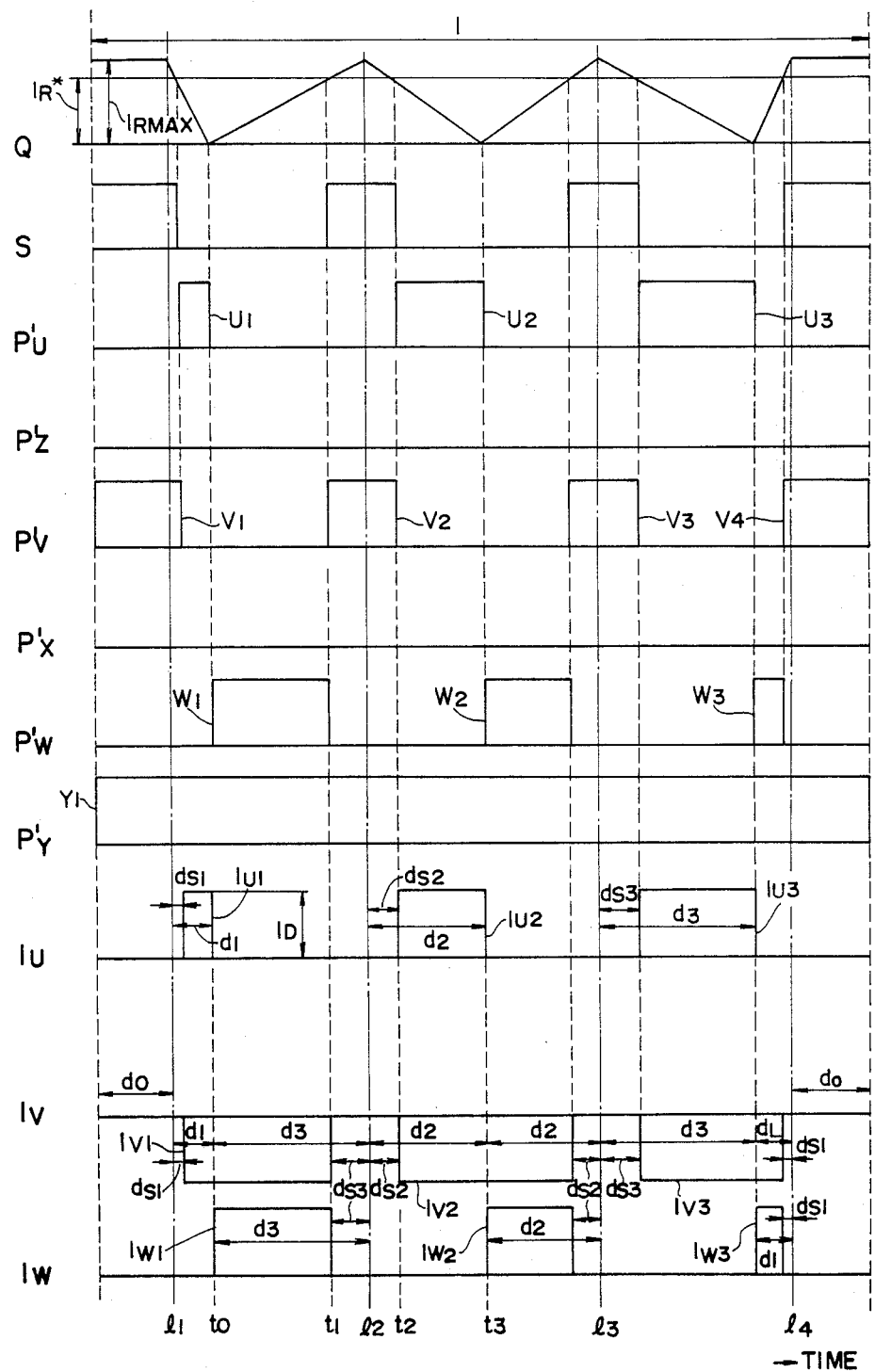
Figure 15:
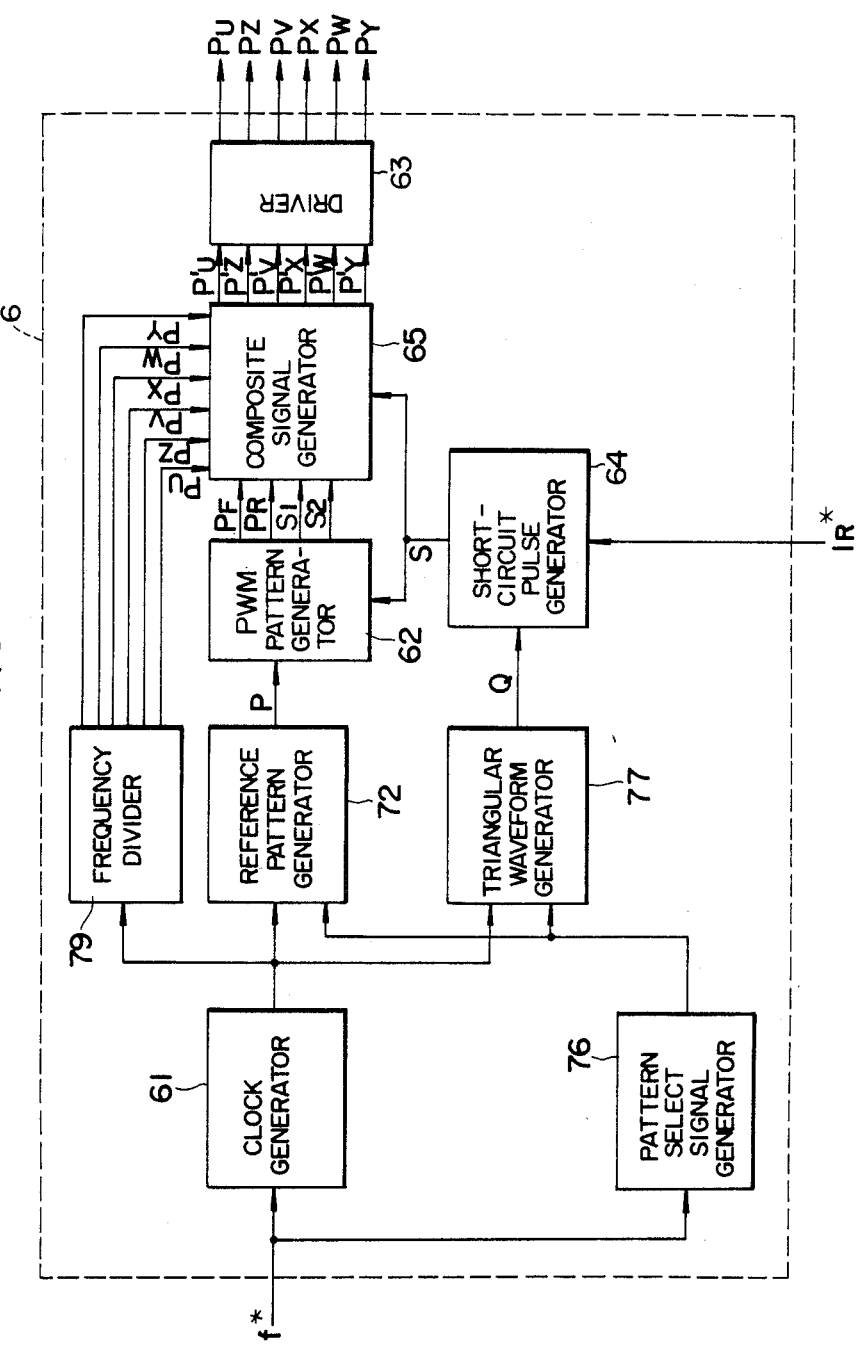
Figure 16:
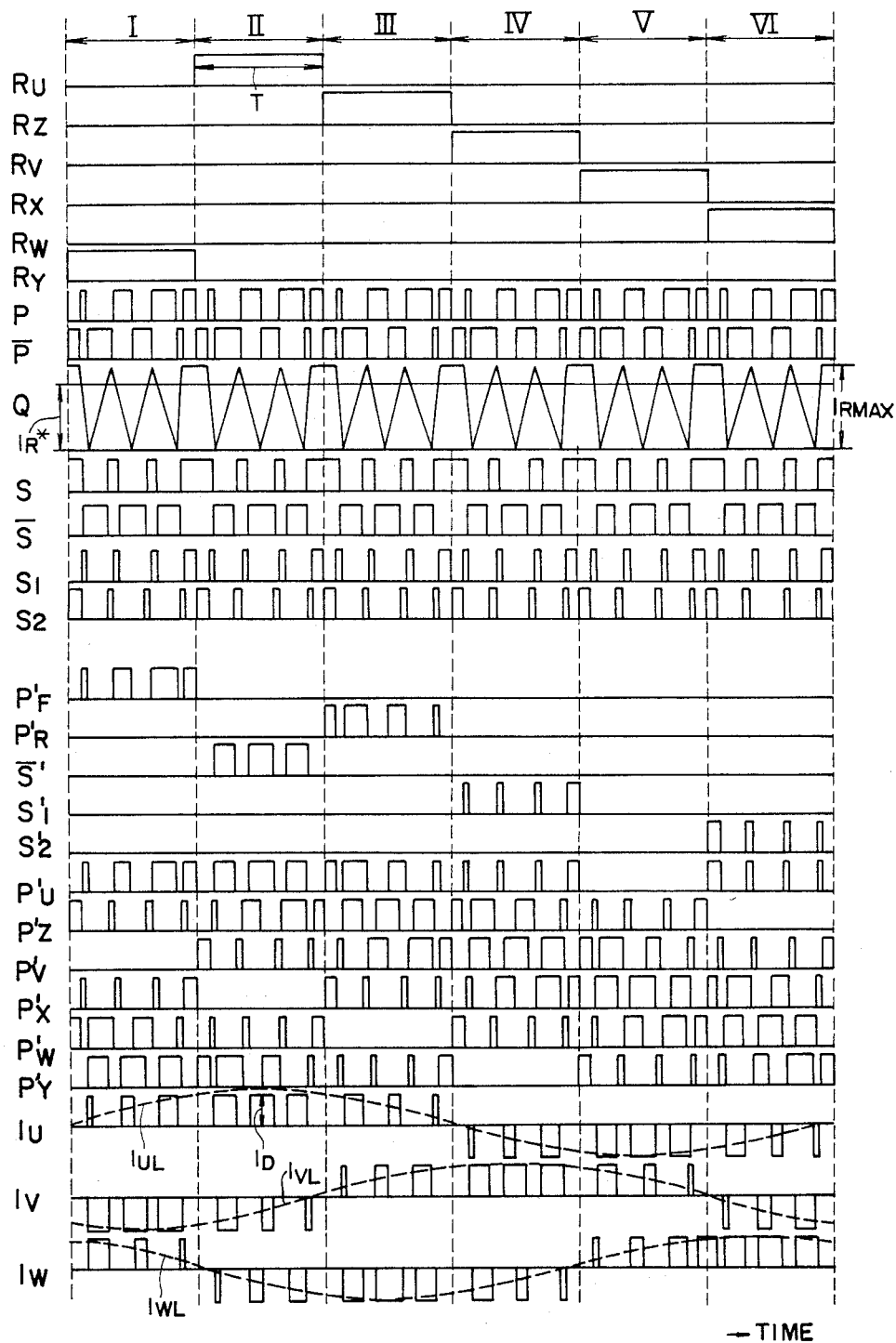
Figure 17:
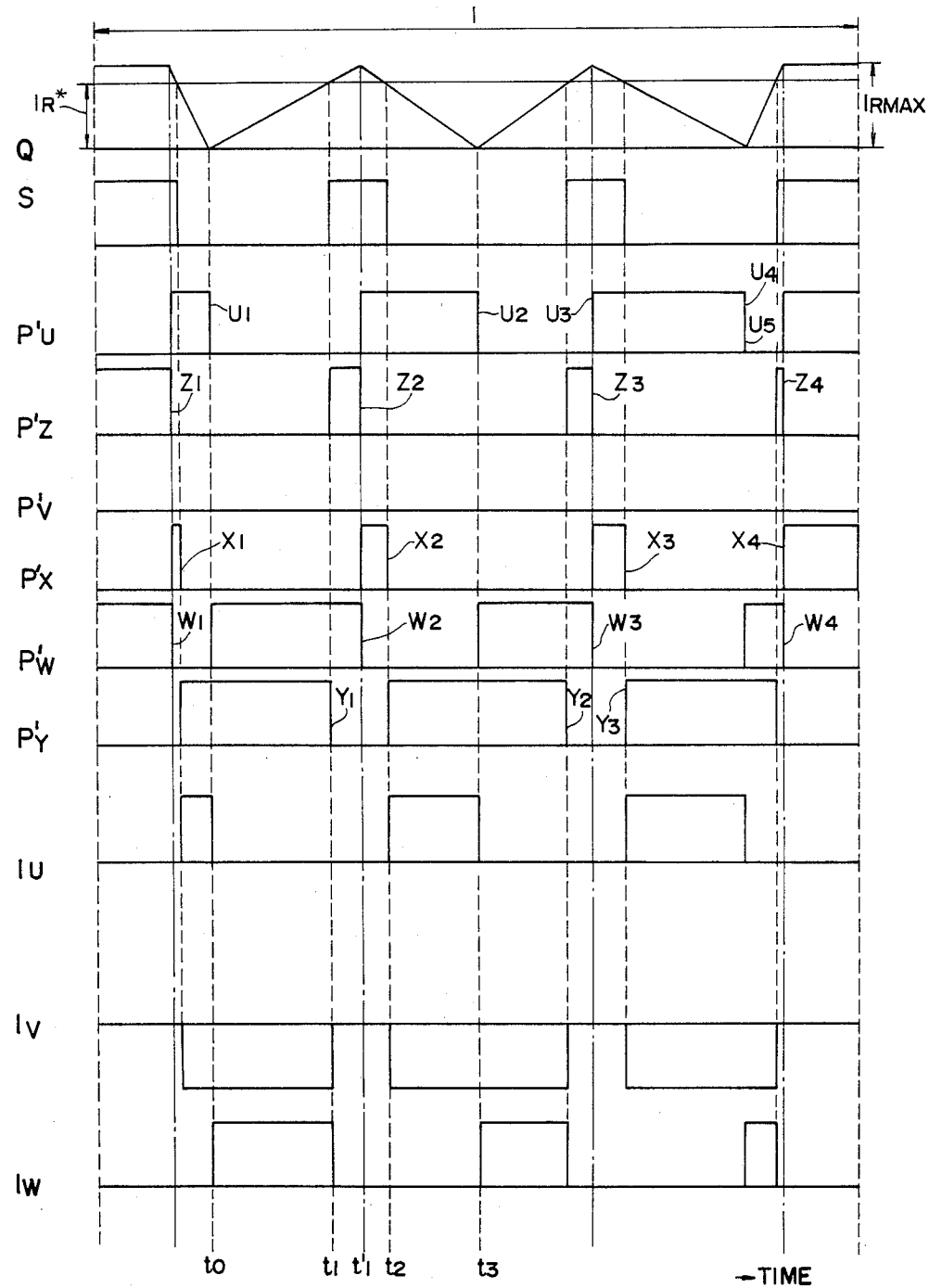
Figure 19:
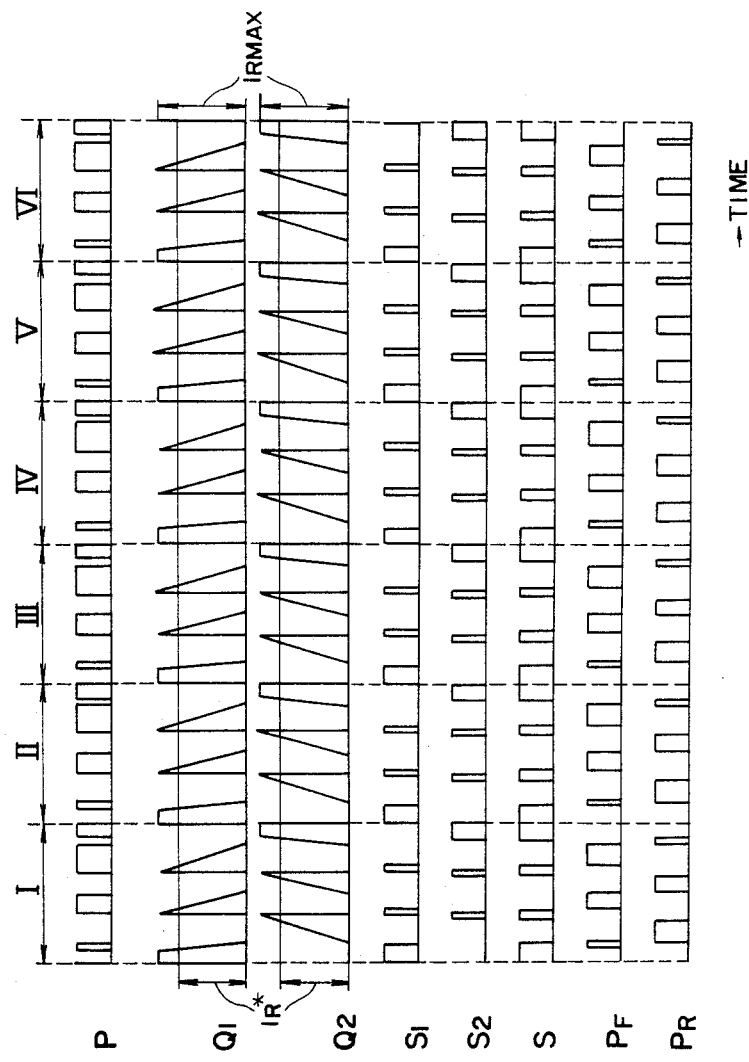
Figure 20:
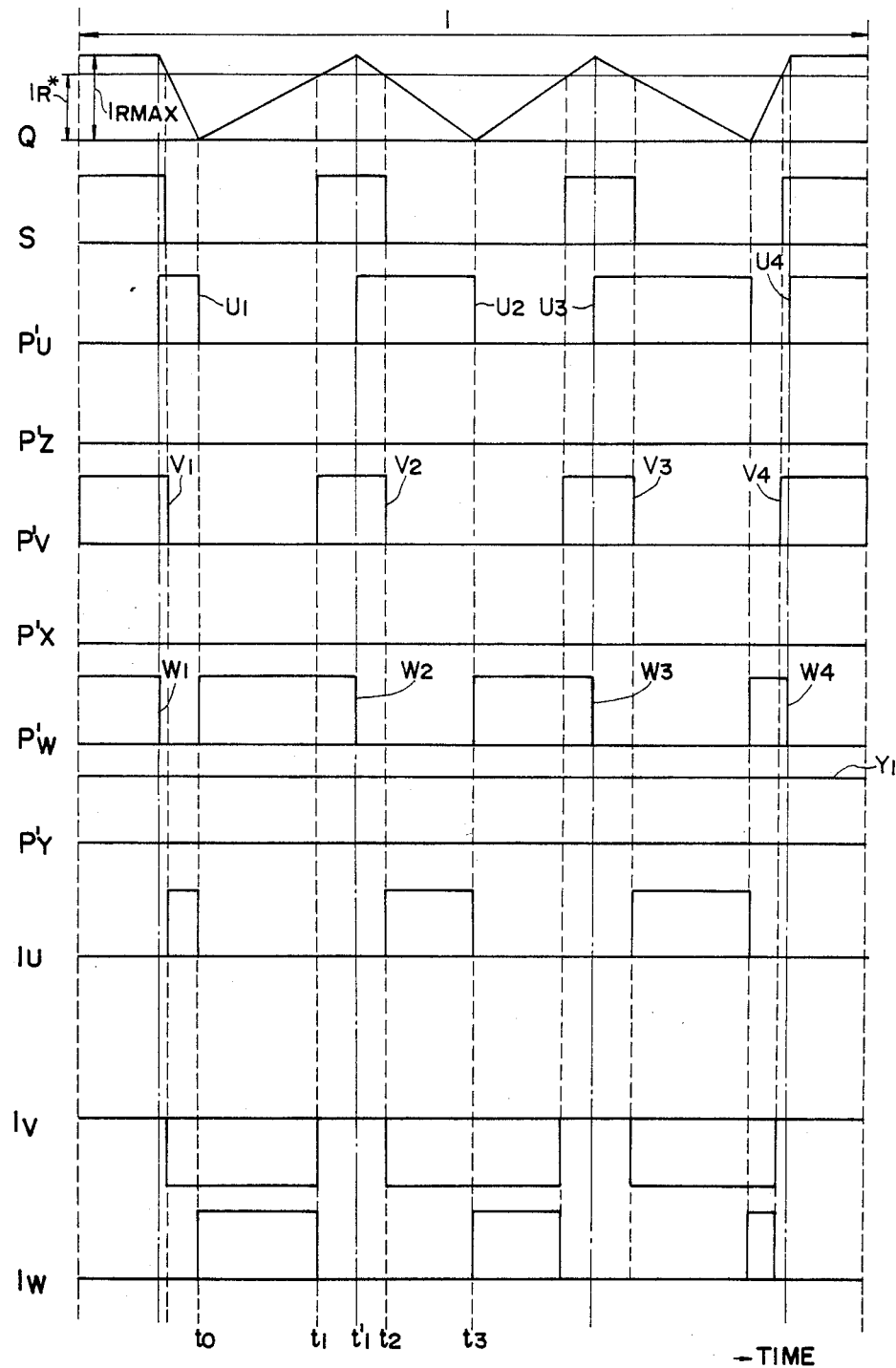

FIGS. 10(a) and 10(b) illustrate the relation between the short-circuit pulse width and the output current waveform in the embodiment shown in FIG. 7;

FIG. 11 is a block diagram showing the structure of still another embodiment of the present invention;

FIG. 12 is a signal and current waveform diagram for illustrating the operation of the embodiment shown in FIG. 11;

FIG. 13 is an enlarged waveform diagram of part of FIG. 12;

FIGS. 14(a) to 14(c) illustrates the inverter operation under the signal condition shown in FIG. 13;

FIG. 15 is a block diagram showing the structure of yet another embodiment of the present invention;

FIG. 16 is a signal and current waveform diagram for illustrating the operation of the embodiment shown in FIG. 15;

FIG. 17 is an enlarged waveform diagram of part of FIG. 16;

FIGS. 18(a) to 18(d) illustrate the inverter operation under the signal condition shown in FIG. 17;

FIG. 19 is a signal and current waveform diagram for illustrating the operation of a further embodiment of the present invention; and FIG. 20 is an enlarged waveform diagram of part of FIG. 19.

Figure 1:
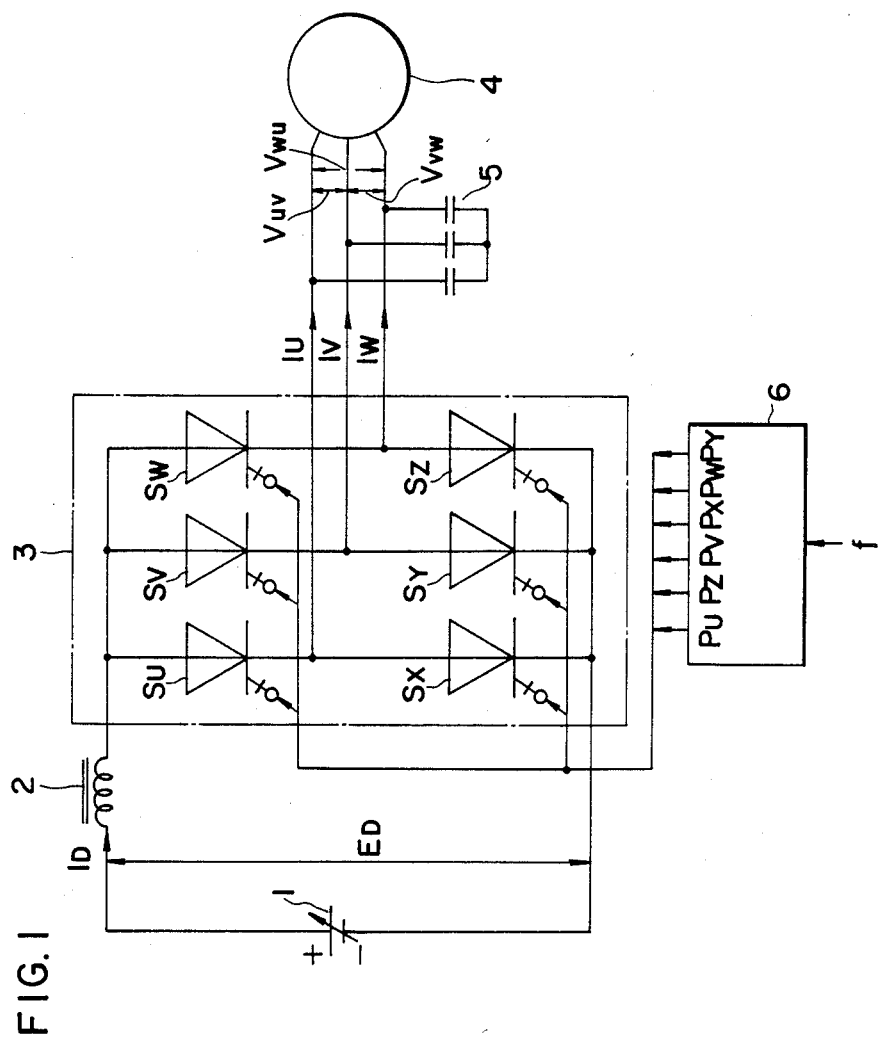
FIG. 1 is a circuit diagram of a current type inverter using self-extinguish elements.

Referring now to the drawings, FIG. 1 shows a current type inverter which has been proposed by the inventors and which utilizes self-extinguish elements such as gate turn-off (GTO) thyristors. Referring to FIG. 1, pairs of self-extinguish elements $S_U$, $S_X$; $S_V$, $S_Y$; and $S_W$, $S_Z$ connected in series are connected in parallel with one another to constitute a bridge circuit of the current type inverter 3 connected across a DC power source 1 through a DC reactor 2 and controlled by a control apparatus 6. Outputs derived from the connection points between the self-extinguish elements $S_U$ and $S_X$, between the self-extinguish elements $S_V$ and $S_Y$, and between the self-extinguish elements $S_W$ and $S_Z$ respectively are supplied to a load 4 which may be a three-phase motor. Three output-terminal capacitors 5 of Y or Δ connection are connected across the output terminals of the inverter 3.

Figure 2:
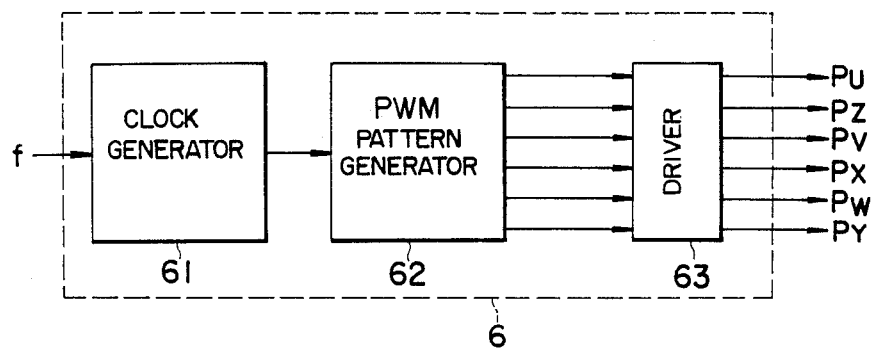
FIG. 2 is a block diagram showing the structure of one form of a prior art inverter control apparatus.

FIG. 2 shows the structure of a prior art control apparatus 6 used for the pulse width modulation (PWM) control of such a current type inverter including such self-extinguish elements. Referring to FIG. 2, the control apparatus 6 includes a clock generating circuit 61, a PWM pattern generating circuit 62 and a drive circuit 63. In response to the application of a frequency command signal f, signals $P_U$, $P_Z$, $P_V$, $P_X$, $P_W$ and $P_Y$ having the desired PWM patterns are applied to the gates of the associated self-extinguish elements $S_U$, $S_Z$, $S_V$, $S_X$, $S_W$ and $S_Y$ respectively.

FIG. 3 is a signal and current waveform diagram showing the waveforms of inverter output currents $I_U$, $I_V$ and $I_W$ compared with those of the gate signals $P_U$, $P_Z$, $P_V$, $P_X$, $P_W$ and $P_Y$ applied to the gates of the respective self-extinguish elements $S_U$, $S_Z$, $S_V$, $S_X$, $S_W$ and $S_Y$ in the inverter 3.

The current type inverter proposed by the inventors and utilizing the self-extinguish elements is advantageous in that, in spite of its simple construction, high-frequency pulse width modulation can be achieved to provide output currents including higher harmonics in a very small proportion. However, as far as triggering of the proposed current type inverter is controlled by the PWM pattern signals provided under consideration of not leaving the inverter in its open-circuit condition, as shown in FIG. 3, it is unable to control the output current value in the inverter itself as in the case of prior art current type inverters.

Figure 4:
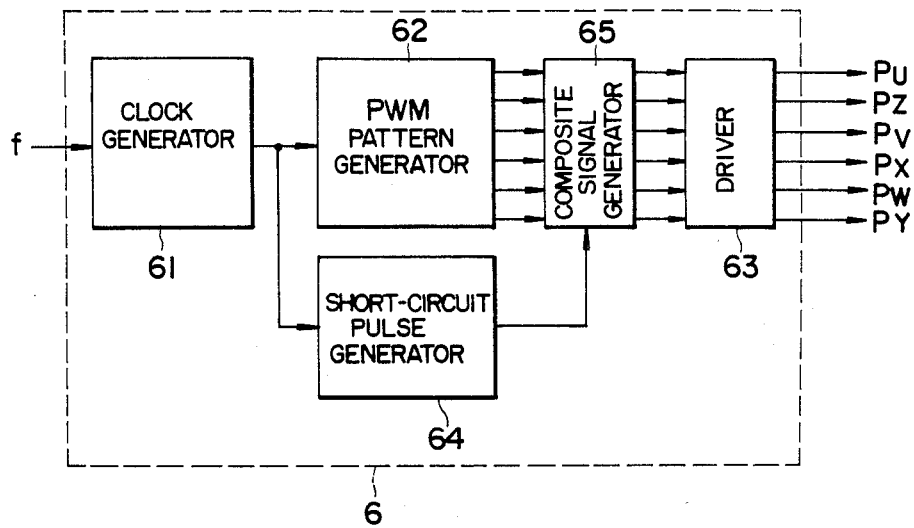
FIG. 4 is a block diagram showing the structure of an embodiment of the inverter control apparatus according to the present invention.

FIG. 4 is a block diagram showing the structure of an embodiment of the inverter control apparatus according to the present invention which has such a function that, while one of the self-extinguish elements forming one of the pairs with the other is turned on, an on pulse is applied to the other at the same time.

Referring to FIG. 4, a clock generating circuit 61 generates a clock signal having a frequency proportional to an inverter frequency command signal f applied thereto. A pulse width modulation (PWM) pattern generating circuit 62 generates, in synchronism with the clock signal, PWM pulse pattern signals having pulse widths corresponding to the triggering (on-off) durations of the individual self-extinguish elements $S_U$, $S_Z$, $S_V$, $S_X$, $S_W$ and $S_Y$. The patterns are such that the pulse width distribution provides inverter output current of sinusoidal waveform. On the basis of the PWM pattern signals applied thereto, a drive circuit 63 generates gate signals $P_U$, $P_Z$, $P_V$, $P_X$, $P_W$ and $P_Y$ which are applied to the gates of the associated self-extinguish elements $S_U$, $S_Z$, $S_V$, $S_X$, $S_W$ and $S_Y$ respectively.

The output signal from the clock generating circuit 61 is applied not only to the PWM pattern generating circuit 62 but also to an on-pulse generating circuit 64 (which will be referred to hereinafter as a short-circuit pulse generating circuit). This short-circuit pulse generating circuit 64 generates short-circuit pulses applied to the self-extinguish elements which form the pairs with those turned on according to the PWM patterns. The PWM pattern generating circuit 62 is similar to that shown in FIG. 2, and its output signals are similar to the signals $P_U$, ..., $P_Y$ shown in FIG. 3. The output signals from the PWM pattern generating circuit 62 are applied together with the output signal from the short-circuit pulse generating circuit 64 to a composite signal generating circuit 65 which provides composite output signals. The output signals from this composite signal generating circuit 65 are applied to the drive circuit 63 to appear therefrom as the signals $P_U$, $P_Z$, $P_V$, $P_X$, $P_W$ and $P_Y$ with the timing shown in FIG. 5. The signals $P_U$, $P_Z$, $P_V$, $P_X$, $P_W$ and $P_Y$ shown in FIG. 5 have waveforms different from those shown in FIG. 3 in that the short-circuit pulses generated from the short-circuit pulse generating circuit 64 are added to the corresponding waveforms shown in FIG. 3.

Figure 6:
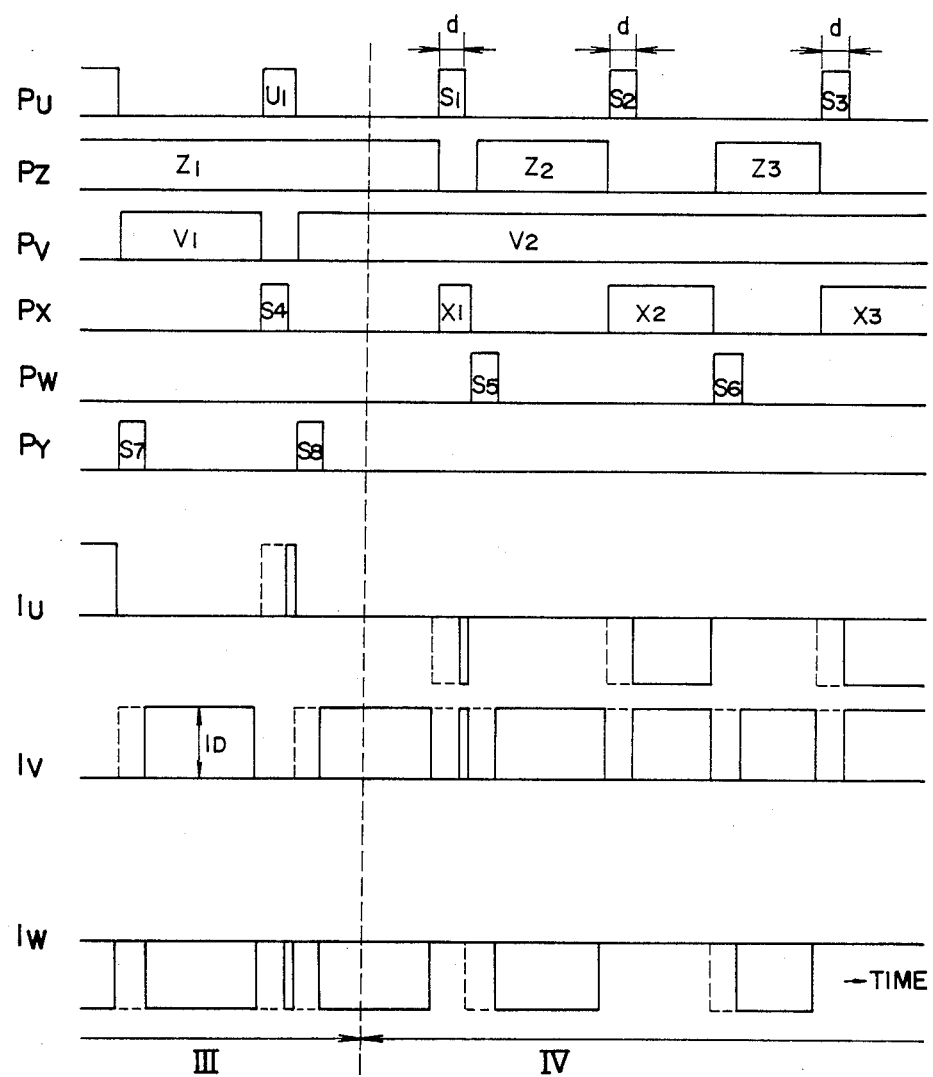
FIG. 6 is an enlarged waveform diagram of part of FIG. 5.

FIG. 6 is an enlarged waveform diagram of part of FIG. 5 for illustrating the generating timing of the short-circuit pulses. Referring to FIG. 6, a signal $U_1$ is generated as the gate signal $P_U$ from the PWM pattern generating circuit 62, and this signal $U_1$ is followed by a train of short-circuit pulses $S_1$, $S_2$ and $S_3$ generated from the short-circuit pulse generating circuit 64 in synchronism with the leading edge of pulses $X_1$, $X_2$ and $X_3$ respectively of the gate signal $P_X$. The pulse width of the short-circuit pulses $S_1$, $S_2$ and $S_3$ is smaller than that of any one of the pulses generated from the PWM pattern generating circuit 62. In the embodiment of the present invention being described, such short-circuit pulses are applied to the self-extinguish element $S_U$ forming the pair with the self-extinguish element $S_X$. However, such short-circuit pulses may be applied to the self-extinguish element $S_Y$ forming the pair with the self-extinguish element $S_V$.

It will be seen from the waveforms of the output currents $I_U$, $I_V$ and $I_W$ shown in FIGS. 5 and 6, the value of these output currents varies depending on the pulse width d of the applied short-circuit pulses. Since, thus, the value of the output currents is small and large when the pulse width d of the short-circuit pulses is large and small respectively, the value of the output currents can be controlled by controlling the pulse width d of the short-circuit pulses.

FIG. 7 is a block diagram showing the structure of another embodiment of the control apparatus according to the present invention. Referring to FIG. 7, a clock generating circuit 61, a PWM pattern generating circuit 62 and a drive circuit 63 have functions similar to those shown in FIG. 2.

A frequency divider circuit 66 divides the frequency of the clock signal generated from the clock generating circuit 61 and acts also to generate a pulse train signal $Q_1$ which has a predetermined pulse width $d_s$ corresponding to the desired output current value and which is synchronous with the frequency-divided clock signal. This pulse train signal $Q_1$ is applied to a short-circuit pulse generating circuit 64.

Figure 8:
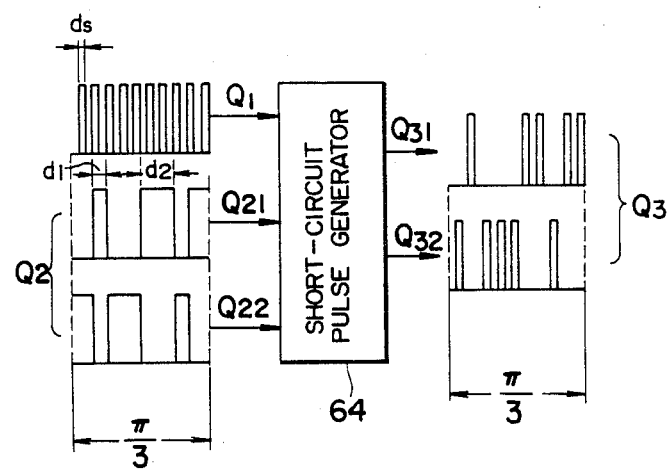
FIG. 8 illustrates the operation of the short-circuit pulse generating circuit in the embodiment shown in FIG. 7.

FIG. 8 illustrates the operation of the short-circuit pulse generating circuit 64. Referring to FIG. 8, the short-circuit pulse generating circuit 64 receives PWM pattern signal portions $Q_{21}$ and $Q_{22}$ of PWM pattern signals $Q_2$ applied from the PWM pattern generating circuit 62. These PWM pattern signal portions $Q_{21}$ and $Q_{22}$ correspond to the phase of 0 to $\frac{1}{3}\pi$ and the phase of $\frac{2}{3}\pi$ to $\pi$, respectively. In the short-circuit pulse generating circuit 64, the PWM pattern signal portions $Q_{21}$ and $Q_{22}$ are applied to AND gates together with the pulse train signal $Q_1$ of predetermined pulse width $d_s$ applied from the frequency divider circuit 66, and the resultant short-circuit pulse train signals $Q_{31}$ and $Q_{32}$ corresponding to the PWM pattern signal portions $Q_{21}$ and $Q_{22}$ respectively are applied to a composite signal generating circuit 65. In the composite signal generating circuit 65, the short-circuit pulse train signals $Q_{32}$ and $Q_{31}$ are added to the (0 to $\frac{1}{3}\pi$) and ($\frac{2}{3}\pi$ to $\pi$) phase portions respectively of PWM pattern signals $Q_5$ generated from the PWM pattern generating circuit 62 for controlling the associated self-extinguish elements. The resultant PWM pattern signals $Q_6$ are applied from the composite signal generating circuit 65 to the drive circuit 63.

Figure 9:
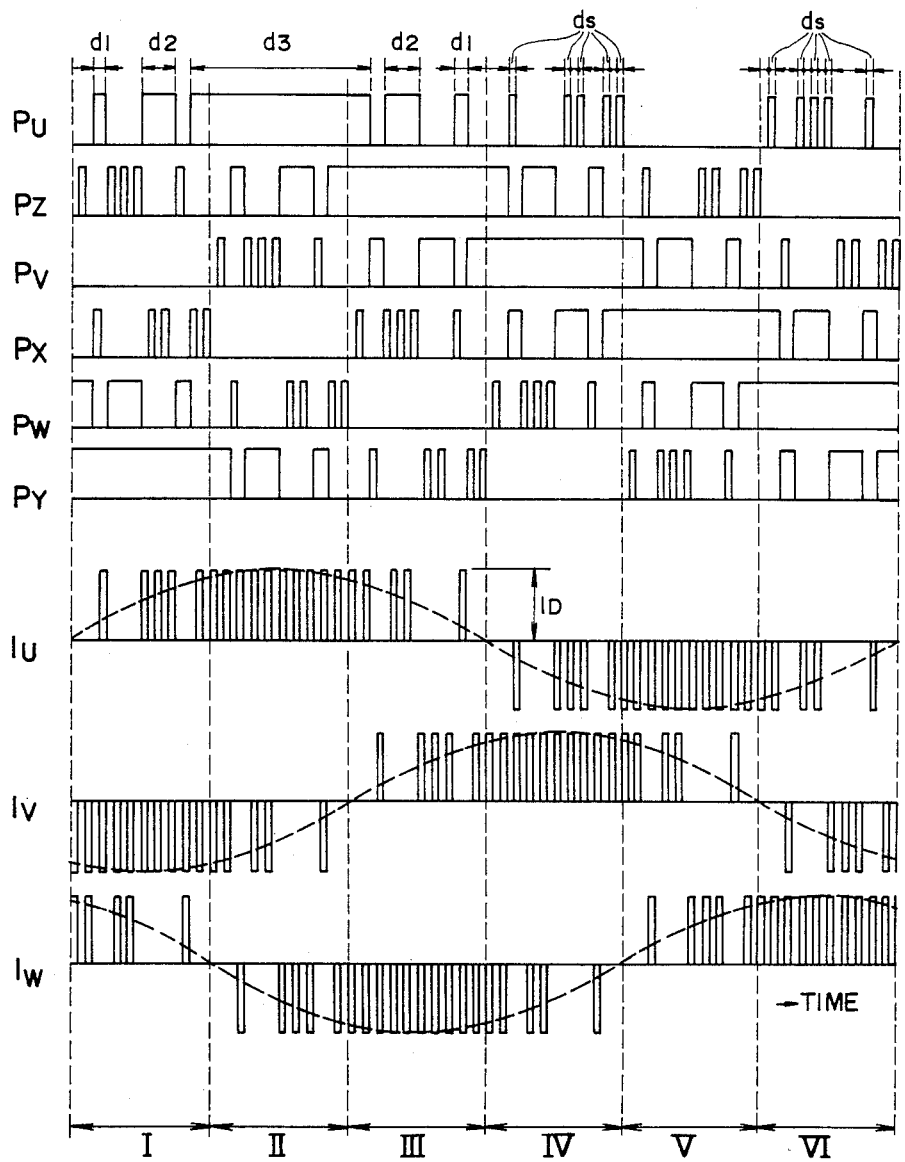
FIG. 9 is a signal and current waveform diagram for illustrating the operation of the embodiment shown in FIG. 7.

In the control apparatus having the structure shown in FIG. 7, gate signals $P_U$, $P_Z$, $P_V$, $P_X$, $P_W$ and $P_Y$ having waveforms as shown in FIG. 9 are generated from the drive circuit 63. Thus, for example, in the period I in FIG. 9, the self-extinguish element $S_W$ is on-off controlled by the gate signal $P_W$ based on the PWM pattern signal $Q_{22}$. On the other hand, the self-extinguish element $S_Z$ forming the pair with and connected in series with the self-extinguish element $S_W$ on the arm of the same phase is on-off controlled by the gate signal $P_Z$ based on the short-circuit pulse train signal $Q_{32}$ as seen in FIG. 9. Similarly, the self-extinguish element $S_U$ is on-off controlled by the gate signal $P_U$ based on the PWM pattern signal $Q_{21}$, and the self-extinguish element $S_X$ is on-off controlled by the gate signal $P_X$ based on the short-circuit pulse train signal $Q_{31}$. In other words, the self-extinguish elements each forming the pair with and connected on the same arm to the self-extinguish element intermittently turned on in the periods I to VI in FIG. 9 are turned on by the short-circuit pulse train signals $Q_3$, and, during the period of the pulse width $d_s$, the DC voltage $E_D$ is short-circuited through the DC reactor 2. During this short-circuited period, the output currents $I_U$, $I_V$ and $I_W$ are null, and, therefore, the output currents $I_U$, $I_V$ and $I_W$ have waveforms as shown in FIG. 9. The waveforms of the currents to be supplied to the load 4 are averaged by the function of the output-terminal capacitors 5 so that the actual currents $I_U$, $I_V$ and $I_W$ supplied to the load 4 have sinusoidal waveforms as indicated by the dotted curves in FIG. 9. According to this second embodiment, the mean values of the output currents $I_U$, $I_V$ and $I_W$ can be controlled over a wide range by varying the pulse width $d_s$ of the short-circuit pulses, and, also, the current waveforms are less distorted than in the case of the first embodiment.

FIGS. 10(a) and 10(b) show the waveform (the half-cycle) of one of the output currents $I_U$, $I_V$ and $I_W$ at different pulse widths $d_s$ of the short-circuit pulses. In the case of FIG. 10(a), in which the pulse width $d_s$ is small, the mean value of the output current is large as indicated by the dotted curve. In contrast, in the case of FIG. 10(b) in which the pulse width $d_s$ is larger than that in FIG. 10(a), the mean value of the output current is small. It will thus be seen that the output currents of the inverter can be varied over a wide range (from about 0% to 100%) even when the value of the direct current $I_D$ is maintained constant. It is needless to mention that the minimum current value is controlled by the minimum allowable pulse width of the short-circuit pulses applied to the self-extinguish elements.

It will be seen from the aforementioned embodiments of the control apparatus according to the present invention that a current type inverter can generate output currents of sinusoidal waveform, and the value of the output currents can be varied over a very wide range.

FIG. 11 is a block diagram showing the structure of still another embodiment of the control apparatus according to the present invention. This embodiment is especially so constructed that pulse patterns of triggering or short-circuit pulses applied to self-extinguish elements are provided by comparing a function signal having the same period as or synchronous with PWM pattern signals with the command value of AC output currents required for the current type inverter.

Referring to FIG. 11, a clock signal having a frequency proportional to an inverter frequency command signal f is generated from a clock generating circuit 61. The frequency command signal f is also applied to a pattern select signal generating circuit 76 which generates a pattern select signal. The clock output signal from the clock generating circuit 61 is applied to a frequency divider circuit 79 which generates distribution signals $R_U$, $R_Z$, $R_V$, $R_X$, $R_W$ and $R_Y$ described in detail later. The clock signal is also applied to a reference pattern generating circuit 72 which generates a reference pattern signal P, and to a non-uniform-period triangular waveform generating circuit 77 which generates a triangular waveform signal W having a non-uniform period synchronous with the reference pattern signal P. The triangular waveform signal Q is compared with an AC output current command signal $I_R^*$ in a short-circuit pulse generating circuit 64 which generates short-circuit pulses S for simultaneously turning on one of the pairs of the self-extinguish elements connected to the positive and negative arms of the inverter thereby forcedly short-circuiting the DC circuit of the inverter. In response to the application of the reference pattern signal P and short-circuit pulses S, a PWM pattern generating circuit 62 generates PWM pattern signals $P_F$ and $P_R$ corresponding to a front 60° period and a rear 60° period in the 180° period of the inverter operation. In response to the application of the distribution signals $P_U$, $R_Z$, $R_V$, $R_X$, $R_W$ and $R_Y$ together with the PWM pattern signals $P_F$, $P_R$ and short-circuit pulses S, a composite signal generating circuit 65 generates composite pattern signals, $P_U'$, $P_Z'$, $P_V'$, $P_X'$, $P_W'$ and $P_Y'$ distributed to the three phases to control each 180° period of the inverter operation. The gate signal patterns $P_U'$, $P_Z'$, $P_V'$, $P_X'$, $P_W'$ and $P_Y'$ thus obtained are applied to a drive circuit 63 to provide gate signals $P_U$, $P_Z$, $P_V$, $P_X$, $P_W$ and $P_Y$ applied to the self-extinguish elements $S_U$, $S_Z$, $S_V$, $S_X$, $S_W$ and $S_Y$ respectively.

FIG. 12 shows in further detail the process of generation of the signals above described. Referring to FIG. 12, the distribution signals $R_U$, $R_Z$, $R_V$, $R_X$, $R_W$ and $R_Y$ generated from the frequency divider circuit 79 have a pulse width T corresponding to the 60° period of the inverter operation and have a phase difference of 60° therebetween. The triangular waveform output signal Q from the non-uniform-period triangular waveform generating circuit 77 has its maximum or peak value $I_{RMAX}$ at the rise time of the pulses of the reference pattern signal P. This triangular waveform signal Q is called the non-uniform-period triangular waveform signal herein since the period of each pulse thereof is determined by the pulse width of the corresponding pulse of the reference pattern signal P and is therefore non-uniform. The AC output current command signal $I_R*$ is compared with the non-uniform-period triangular waveform signal Q to provide the short-circuit pulse train S as shown in FIG. 12. Then, the reference pattern signal P and short-circuit pulse signal S are inverted to provide an inverted reference pattern signal $\bar{P}$ and an inverted short-circuit pulse signal $\bar{S}$ respectively. The signals P and $\bar{S}$ are applied to an AND gate to obtain the signal $P_F$, and the signals $\bar{P}$ and $\bar{S}$ are applied to another AND gate to obtain the signal $P_R$. The signals $P_F$, $R_Y$, $P_R$, $P_Z$, and S, $R_X$ are applied to AND gates to obtain signals $P_F'$, $P_R'$ and S' respectively, and, then, the signals $P_F'$, $P_R'$, S' and $R_U$ are applied to an OR gate to obtain the gate signal pattern $P_U'$ applied to the gate of the self-extinguish element $S_U$. Entirely similarly, the gate signal patterns $P_Z'$, $P_V'$, $P_X'$, $P_W'$ and $P_Y'$ for the other self-extinguish elements $S_Z$, $S_V$, $S_X$, $S_W$ and $S_Y$ respectively can be obtained. The output currents $I_U$, $I_V$ and $I_W$ of the inverter controlled by the gate signals $P_U$, $P_Z$, $P_V$, $P_X$, $P_W$ and $P_Y$ in each cycle of the inverter operation have pulse-width modulated waveforms over 360° as shown in FIG. 12.

FIG. 13 is an enlarged waveform diagram showing in further detail the waveforms of the triangular waveform signal Q, gate signal patterns $P_U'$, $P_Z'$, $P_V'$, $P_X'$, $P_W'$, $P_Y'$, and output currents $I_U$, $I_V$, $I_W$ in the inverter operation period I shown in FIG. 12. In this period I, the short-circuit pulse train S obtained as a result of comparison between the triangular waveform signal Q and the output current command $I_R*$ corresponds to the gate signal pattern $P_V'$.

Figure 14:
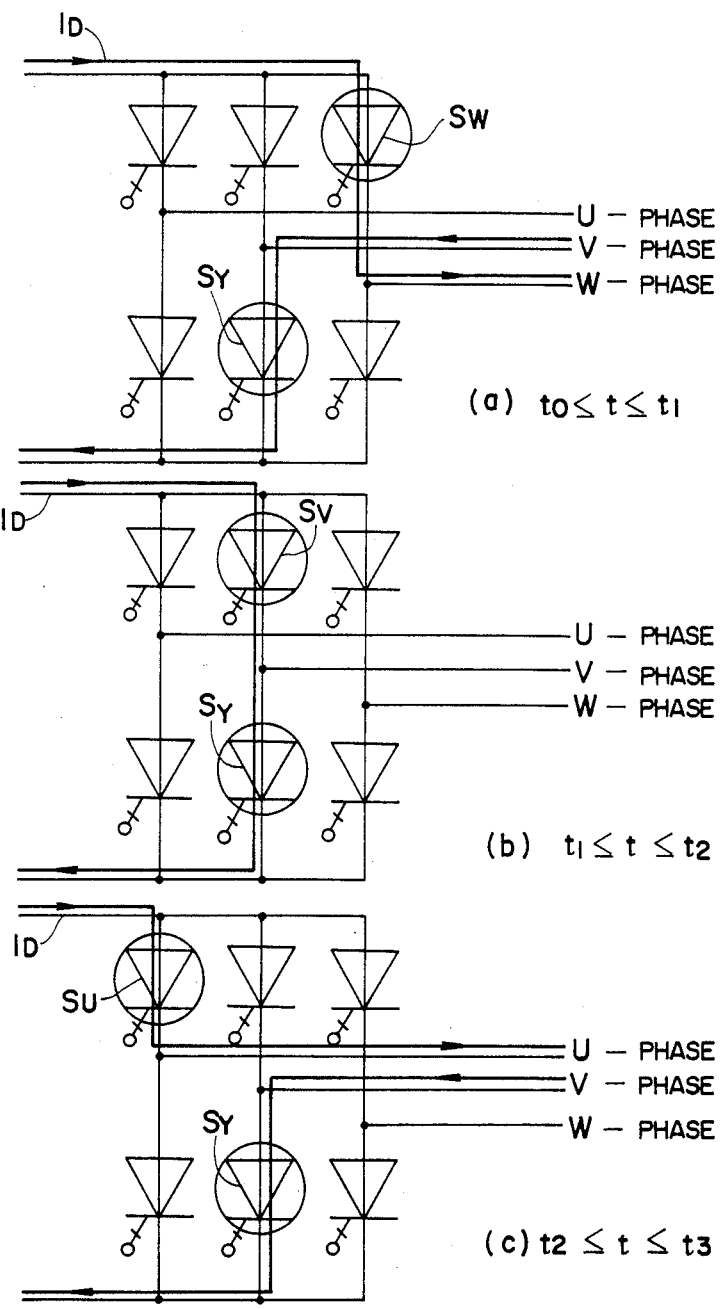

The fact that the output currents $I_U$, $I_V$ and $I_W$ of the inverter are null in the short-circuited period will be described with reference to FIG. 14, and how the values of the output currents $I_U$, $I_V$ and $I_W$ can be controlled by varying the value of the AC output current command $I_R*$ will then be described. FIG. 14 illustrates the operation of the inverter circuit before and after a signal $V_2$ of the gate signal pattern $P_V'$ shown in FIG. 13 is applied. In FIG. 13, suppose that the output current $I_W$ rises at time $t_0$, falls at time $t_1$ and rises again at time $t_3$, while the output current $I_V$ rises at time $t_2$ between the times $t_1$ and $t_3$. Then, the operating conditions of the inverter from time $t_0$ to time $t_3$ are as shown in FIGS. 14(a), 14(b) and 14(c). In the periods $t_0 \leq t \leq t_1$ and $t_2 \leq t \leq t_3$ shown in FIGS. 14(a) and 14(b) respectively, the inverter makes its usual switching operation. However, in the period $t_2 \leq t \leq t_3$ shown in FIG. 14(b), the gate signal $V_2$, hence, the short-circuit pulse S acts to turn on the self-extinguish element $S_V$, and the DC circuit is short-circuited by the self-extinguish elements $S_V$ and $S_Y$, with the result that the direct current $I_D$ flows under the DC short-circuited condition of the inverter. At this time, the output currents of U-phase, V-phase and W-phase are not supplied to the load 4. On the other hand, when the value of the AC output current command $I_R*$ is varied from zero to the maximum $I_{RMAX}$, the short-circuit periods $d_{S1}$, $d_{S2}$ and $d_{S3}$ of the output current $I_U$ vary from $d_1$, $d_2$ and $d_3$ to zero respectively while maintaining the following relation:

$$\frac{d_{S1}}{d_1} = \frac{d_{S2}}{d_2} = \frac{d_{S3}}{d_3} = 1 - \frac{I_R*}{I_{RMAX}} \qquad (1)$$

The output current $I_W$ is entirely similarly controlled. In the case of the output current $I_V$ too, the periods $d_{S1}$, $d_{S2}$ and $d_{S3}$ vary while maintaining the following relation:

$$\frac{d_{S1} + d_{S3}}{d_1 + d_3} = \frac{d_{S2} + d_{S2}}{d_2 + d_2} = \frac{d_{S3} + d_{S1}}{d_3 + d_1} = 1 - \frac{I_R*}{I_{RMAX}} \qquad (2)$$

The value of the effective current $I_{RMS}$ at this time is given by the following equation:

$$I_{RMS} = \sqrt{\frac{2(d_1 + d_2 + d_3)}{3(d_0 + d_1 + d_2 + d_3)}} \times \sqrt{\frac{I_R*}{I_{RMAX}}} \times I_D \qquad (3)$$

The value of the effective current $I_{RMS}=0$ when $I_R*=0$ and short-circuit continues throughout the periods, and $I_{RMS}$ is given by the following equation when $I_R*=I_{RMAX}$:

$$I_{EMS} = \sqrt{\frac{2(d_1 + d_2 + d_3)}{3(d_0 + d_1 + d_2 + d_3)}} \times I_D \qquad (4)$$

The value of $I_{RMX}$ varies in proportion to $\sqrt{I_R*}$ since the values of $I_D$, $I_{RMAX}$, and $d_0$ to $d_3$ are constant.

In the present embodiment, the PWM patterns corresponding to the intermediate 60° period in the 180° period of the inverter operation are similarly provided as shown in the waveforms of the output currents $I_U$, $I_V$ and $I_W$ in FIG. 12, and therefore, the content of higher harmonics in the output currents can be decreased to a minimum. Further, the output currents can be controlled over the wide range of from zero to the maximum value given by the equation (4) determined by the PWM reference pattern signal P.

In the embodiment shown in FIG. 11, the short-circuit pulses have been included in the intermediate 60° period portion of the 180° period in which no PWM pattern signals are present. This period corresponds to, for example, the inverter operation period V in the case of the gate signal pattern $P_U'$ in FIG. 12. However, the short-circuit pulses may be included in the 120° period portion of the 180° period in which no PWM pattern signal is present and from which the intermediate 60° period portion is excluded. For example, the short-circuit pulses may be included in the inverter operation periods IV and VI in the case of the gate signal pattern $P_U'$.

FIG. 15 is a block diagram of such a modification of the control apparatus. This modification differs from the embodiment shown in FIG. 11 in that short-circuit pulse trains $S_1$ and $S_2$ are added to the outputs of the PWM pattern generating circuit 62, and the function of the composite signal generating circuit 65 is different from that shown in FIG. 11. FIG. 16 shows the process of signal formation in this modification. Referring to FIGS. 15 and 16, the triangular waveform signal Q is compared with the value of the AC output current command $I_R*$ to produce the short-circuit pulse train S. Then, the signals P and S are inverted to provide the inverted signals $\bar{P}$ and $\bar{S}$, and the signals $\bar{P}$, S and P, S are applied to AND gates to obtain short-circuit pulse trains $S_2$ and $S_1$ respectively. Then, in the composite signal generating circuit 65, the signals $P_F(=P)$, $R_Y$; $\bar{S}$, $R_U$; $P_R (=P)$, $R_Z$; $S_1$, $R_V$; and $S_2$, $R_W$ are applied to AND gates to obtain signals $P_F'$, $\bar{S}'$, $P_R'$, $S_1'$, and $S_2'$ respectively, and these signals $P_F'$, $\bar{S}'$, $P_R'$, $S_1'$ and $S_2'$ are applied to an OR gate to obtain the gate signal pattern $P_U'$ to be applied to the self-extinguish element $S_U$. In an entirely similar manner, the gate signal patterns for the other self-extinguish elements can be provided. As a result, the output currents $I_U$, $I_V$ and $I_W$ of the inverter controlled by the gate signals $P_U$, $P_Z$, $P_V$, $P_X$, $P_W$ and $P_Y$ in each cycle of the inverter operation have pulse-width modulated waveforms over 360° as shown in FIG. 16.

Figure 18:
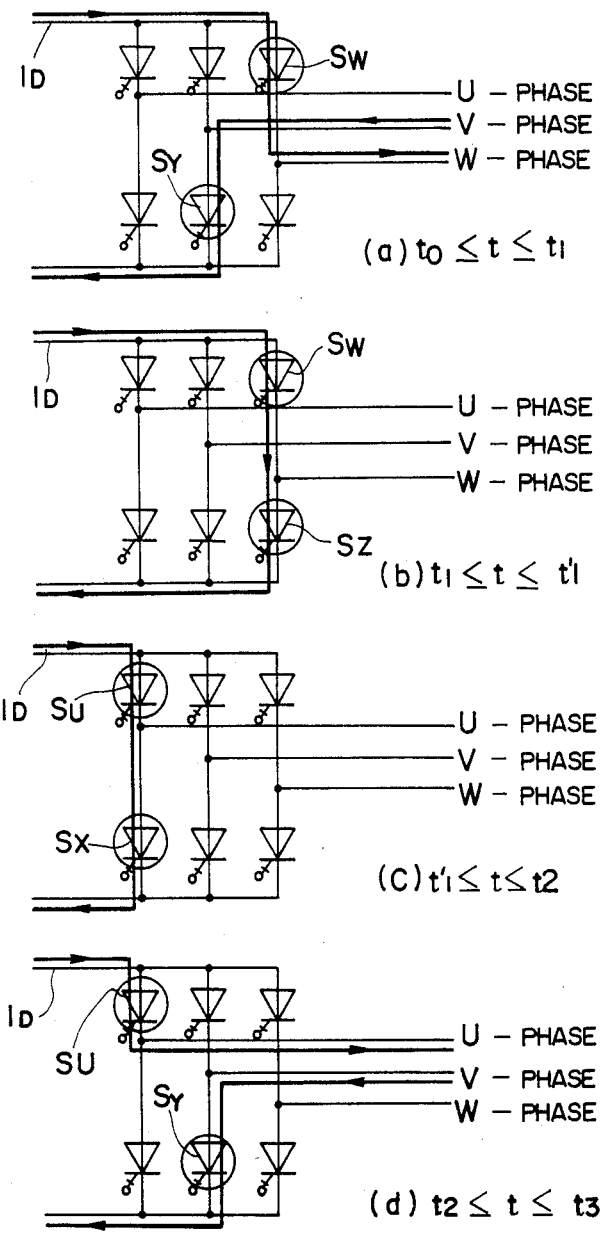

FIG. 17 is an enlarged waveform showing in further detail the waveforms of the triangular waveform signal Q, gate signal patterns $P_U'$, $P_Z'$, $P_V'$, $P_X'$, $P_W'$, $P_Y'$ and output currents $I_U$, $I_V$, $I_W$ in the inverter operation period I shown in FIG. 16. In this period I, the short-circuit pulse train S obtained as a result of comparison between the triangular waveform signal Q and the AC output current command $I_R*$ is divided to be included in the signals $P_Z'$ and $P_X'$. FIG. 18 illustrates how the inverter operates from time $t=t_0$ to time $t=t_3$ in the diagram shown in FIG. 17. FIG. 18 illustrating the states of the inverter circuit controlled by the control apparatus shown in FIG. 15 differs from FIG. 14 illustrating the states of the inverter circuit controlled by the control apparatus shown in FIG. 11 in that, whereas the DC circuit is short-circuited in the V-phase in the period $t_1 \leq t \leq t_2$ in the case of the latter, it occurs in both of the W-phase and V-phase in the case of the former. Except for the above difference, the manner of output current control in the modification shown in FIG. 15 is similar to that in the embodiment shown in FIG. 11.

It will be seen from the diagrams of FIGS. 14 and 18 illustrating the circuit states of the embodiments shown in FIGS. 11 and 15 respectively that the effect of the present invention is entirely the same when these two embodiments are combined so that short-circuit of the DC circuit occurs in three periods in a fashion distributed to the W-phase, V-phase and U-phase. In this case, the short-circuit pulse train S is included in all of the 180° periods where no PWN pattern signals are present.

In the aforementioned embodiments, the short-circuit pulse train S has been produced by comparing the triangular waveform signal Q with the AC output current command $I_R*$. However, the effect of the present invention is entirely the same when the triangular waveform signal Q is split into two non-uniform-period sawtooth waveform signals by bisecting at the peak of the signal Q. As an example, whereas a triangular waveform signal Q as shown in FIG. 12 is generated from the non-uniform-period triangular waveform generating circuit 77 in the embodiment shown in FIG. 11, such a signal Q may be split into two sawtooth waveform signals $Q_1$ and $Q_2$ as shown in FIG. 19, and these signals $Q_1$ and $Q_2$ may be compared with the AC output current command $I_R*$ to obtain short-circuit pulse trains $S_1$ and $S_2$ respectively. These pulse trains $S_1$ and $S_2$ are then applied to an OR gate to derive a pulse train entirely similar to the short-circuit pulse train S shown in FIG. 12. Gate signals to be applied to the self-extinguish elements can then be produced on the basis of the short-circuit pulse train S as described with reference to FIG. 12 thereby providing output currents having entirely similar waveforms. Further, the value of the output currents can be similarly varied as described.

Further, in the embodiment shown in FIG. 11 or 15, the PWM pattern signal $P_F$ corresponding to the front 60° period may be used as the reference pattern signal P, and the PWM pattern signal $P_R$ corresponding to the rear 60° period may be used as the inverted signal $\bar{P}$. FIG. 20 shows the waveforms of the gate signal patterns and output currents in the inverter operation period I in such a case. FIG. 20 differs from FIG. 13 showing the operation of the embodiment shown in FIG. 11 in that, when, for example, a signal $V_2$ of the gate signal pattern $P_V'$ is in its high level in the period $t_1 \leq t \leq t_2$, a signal $W_2$ of the gate signal pattern $P_W'$ is in its high level in the period $t_0 \leq t \leq t_1'$ and a signal $U_2$ of the gate signal pattern $P_U'$ is in its high level in the period $t_1' \leq t \leq t_3$. According to the diagram shown in FIG. 20, during the transition from the circuit state shown in FIG. 14(a) to that shown in FIG. 14(b), the self-extinguish element $S_V$ is turned on while maintaining the self-extinguish element $S_W$ in its on state, and the self-extinguish element $S_U$ is then turned on at time $t=t_1'$ while maintaining the self-extinguish element $S_V$ in its on state. Thereafter, the self-extinguish element $S_V$ is turned off at time $t=t_2$ to cause transition of the circuit state from that shown in FIG. 14(b) to that shown in FIG. 14(c). When the self-extinguish element $S_W$ continues to be turned on during transition of the circuit state from that shown in FIG. 14(a) to that shown in FIG. 14(b) while the load which may be an electric motor is under regenerative operation, application of the gate signal to the self-extinguish element $S_V$ would not turn on this self-extinguish element $S_V$ and the desired inverter operation would not be done since the V-phase voltage is higher than the W-phase voltage. Therefore, the embodiment described with reference to FIG. 20 is as effective as the embodiments described with reference to FIGS. 11 and 15 when a static load or regenerative operation of the load is not taken into consideration, since the desired operation of the inverter is not done during the regenerative operation of the load, although this specific embodiment is advantageous for simplifying the structure of the PWM pattern generating circuit 62. This specific embodiment is also effective for operation with the sawtooth waveform signals having the non-uniform period.

It will be understood from the foregoing detailed description of the present invention that output currents of a current type inverter can be controlled over a wide range while suppressing the content of higher harmonics in the output currents to a very small proportion. Especially when the load is an electric motor, the noise can be suppressed to a low level and the efficiency can also be increased. The present invention is further advantageous for simplifying the circuit structure of the inverter and improving the response of the inverter.

We claim:

1. An apparatus for controlling a current type inverter including a bridge circuit of bridge-connected self-extinguish elements triggered by pulse width modulation signals, said apparatus comprising:
   clock generator means for generating a clock signal in accordance with a frequency command;
   pulse width modulation pattern generation circuit means for generating, in synchronism with said clock signal, pulse width modulation pattern signals for respective ones of said self-extinguish elements;
   short-circuit pulse generating circuit means for generating, in synchronism with said clock signal, short-circuit pulses having a predetermined pulse width for turning on ones of said self-extinguish elements connected in series with others of said self-extinguish elements to form pairs in said bridge circuit, the others of said self-extinguish elements being turned on by the corresponding pulse width modulation pattern signals, thereby enabling short-circuiting of a DC of said inverter;
   composite circuit means for generating trigger pattern signals for triggering said self-extinguish elements of said bridge circuit in accordance with said pulse width modulation pattern signals and said short-circuit pulse signals; and
   driver circuit means for delivering trigger signals to said self-extinguish elements of said bridge circuit in accordance with said trigger pattern signals.

2. A control apparatus according to claim 1, wherein said short-circuit pulse generating circuit means enables variation of the pulse width of said short-circuit pulse signals in accordance with a desired output current value of said inverter.

3. A control apparatus according to claim 1, wherein said short-circuit pulse generating circuit means enables synchronization of said short-circuit pulse signals with rising edges of said pulse width modulation pattern signal.

4. A control apparatus according to claim 1, wherein said short-circuit pulse generating circuit means generates said short-circuit pulse signals having a pulse width smaller than any of pulse widths of said pulse width modulation pattern signals.

5. An apparatus for controlling a current type inverter including a bridge circuit of bridge-connected self-extinguish elements triggered by pulse width modulation signals, said apparatus comprising:
   clock generator means for generating a clock signal in accordance with a frequency command;
   pulse width modulation pattern generation circuit means for generating, in synchronism with said clock signal, pulse width modulation pattern signals for respective ones of said self-extinguish elements of said bridge circuit;
   frequency dividing circuit means for generating a pulse train signal having a predetermined pulse width in synchronism with a frequency divided signal obtained by frequency dividing said clock signal;
   short-circuit pulse generating circuit means for ANDing said pulse train signal and portions of said pulse width modulation pattern signals having a phase of 0 to $\frac{1}{3}\pi$ and a phase $\frac{2}{3}\pi$ to $\pi$, and for generating short-circuit pulse signals for turning on ones of said self-extinguish elements connected in series with others of said self-extinguish elements to form pairs in said bridge circuit, the others of said self-extinguish elements being turned on by the corresponding pulse width modulation pattern signals, thereby enabling short-circuiting of a DC circuit of said inverter;
   composite circuit means for generating trigger pattern signals for triggering said self-extinguish elements of said bridge circuit in accordance with said pulse width modulation pattern signals and said short-circuit pulse signals; and
   driver circuit means for delivering trigger signals to said self-extinguish elements of said bridge circuit in accordance with said trigger pattern signals.

6. A control apparatus according to claim 5, wherein said frequency dividing circuit means enables variation of the pulse width of said pulse train signal in accordance with a desired output current value of said inverter.

7. An apparatus for controlling a current type inverter including a bridge circuit of bridge-connected self-extinguish elements triggered by pulse width modulation signals, said apparatus comprising:
   clock generator means for generating a clock signal in accordance with a frequency command;
   reference pattern signal generating circuit means for generating, in synchronism with said clock signal, a reference pattern signal having a phase of 0 to $\frac{1}{3}\pi$ of pulse width modulation pattern signals and being synchronous with respect to $1/6\pi$ thereof;
   non-uniform-period triangular waveform signal generator means for generating a non-uniform-period triangular waveform signal corresponding to said reference pattern signal in synchronism with said clock signal;
   short-circuit pulse generating circuit means for comparing said non-uniform-period triangular waveform signal with a command value of an output current of said inverter, and for generating short-circuit pulse signals for turning on ones of said self-extinguish elements connected in series with other of said self-extinguish elements to form pairs in said bridge circuit, the others of said self-extinguish elements being turned on by corresponding pulse width modulation pattern signals, thereby enabling short-circuiting of a DC circuit of said inverter;
   pulse width modulation pattern signal generating circuit means for generating pulse width modulation pattern signals for said self-extinguish elements of said bridge circuit in accordance with said reference pattern signal and said short-circuit pulse signals;
   composite circuit means for generating trigger pattern signals for triggering said self-extinguish elements of said bridge circuit in accordance with said pulse width modulation pattern signals and said short-circuit pulse signals; and
   driver circuit means for delivering trigger signals to said self-extinguish elements of said bridge circuit in accordance with said trigger pattern signals.

8. A control apparatus according to claim 7, wherein said short-circuit pulse generating circuit means forms said short-circuit pulse signals such that said short-circuit pulse signals exist in a phase of $\frac{1}{3}\pi$ to $\frac{2}{3}\pi$ of a period $\pi$ where said pulse width modulation pattern signals are not present.

9. A control apparatus according to claim 8, wherein said short-circuit pulse generating circuit means forms said short-circuit pulse signals such that said short-circuit pulse signals exist in a phase of 0 to $\frac{1}{3}\pi$ or $\frac{2}{3}\pi$ to $\pi$ of a period $\pi$ where said pulse width modulation pattern signals are not present.

* * * * *